United States Patent
Kalb et al.

(10) Patent No.: US 9,506,319 B2
(45) Date of Patent: Nov. 29, 2016

(54) COMPOSITE WELLBORE BALL VALVE

(75) Inventors: Frank David Kalb, Lantana, TX (US); Andrew John Webber, Coppell, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/420,274

(22) PCT Filed: Sep. 12, 2012

(86) PCT No.: PCT/US2012/054776
§ 371 (c)(1),
(2), (4) Date: Feb. 6, 2015

(87) PCT Pub. No.: WO2014/042622
PCT Pub. Date: Mar. 20, 2014

(65) Prior Publication Data
US 2015/0315870 A1    Nov. 5, 2015

(51) Int. Cl.
E21B 34/06 (2006.01)
F16K 5/06 (2006.01)
E21B 34/08 (2006.01)
E21B 34/00 (2006.01)

(52) U.S. Cl.
CPC ............ *E21B 34/06* (2013.01); *E21B 34/08* (2013.01); *F16K 5/0657* (2013.01); *E21B 2034/002* (2013.01)

(58) Field of Classification Search
CPC .... E21B 2034/002; E21B 34/06; F16K 1/14; F16K 5/0657; Y10T 137/7036
See application file for complete search history.

(56) References Cited

U.S. PATENT DOCUMENTS

| | | | |
|---|---|---|---|
| 2,249,127 A * | 7/1941 | Goetze | F16J 15/12 210/450 |
| 4,269,391 A | 5/1981 | Saito et al. | |
| 4,425,965 A * | 1/1984 | Bayh, III | E21B 23/02 166/106 |
| 4,457,491 A * | 7/1984 | Dudman | F16K 5/0673 251/317 |
| 4,601,308 A * | 7/1986 | Stone | F16K 5/0631 137/315.21 |
| 4,753,443 A | 6/1988 | Nicholson | |
| 4,765,592 A | 8/1988 | Minai | |
| 4,771,803 A | 9/1988 | Berchem et al. | |
| 5,104,092 A | 4/1992 | Block et al. | |

(Continued)

FOREIGN PATENT DOCUMENTS

| | | |
|---|---|---|
| EP | 0053983 | 6/1982 |
| JP | 2000-097355 | 4/2000 |
| KR | 10-0425788 | 3/2004 |

OTHER PUBLICATIONS

Authorized Officer Sun Kim, PCT International Search Report and Written Opinion of the International Searching Authority, PCT/US2012/054776, Mar. 13, 2013, 9 pages.

(Continued)

*Primary Examiner* — Robert E Fuller
*Assistant Examiner* — Christopher Sebesta
(74) *Attorney, Agent, or Firm* — Scott Richardson; Parker Justiss, P.C.

(57) ABSTRACT

A composite wellbore ball valve has a spherical, fiber reinforced composite ball valve closure. The closure has an interior, central through-bore and an annular metallic sealing surface. A ball carrying assembly has an annular, metallic sealing seat surface adapted to contact and form a metal-tometal seal with the metallic sealing surface of the ball valve closure when the ball valve closure is closed.

17 Claims, 4 Drawing Sheets

(56) References Cited

U.S. PATENT DOCUMENTS

| | | | |
|---|---|---|---|
| 5,746,417 A * | 5/1998 | Bowers | F16K 5/202 |
| | | | 251/188 |
| 6,708,770 B2 | 3/2004 | Slup et al. | |
| 7,600,572 B2 | 10/2009 | Slup et al. | |
| 7,681,650 B2 | 3/2010 | Telfer et al. | |
| 2004/0163820 A1 | 8/2004 | Bishop et al. | |
| 2005/0173002 A1* | 8/2005 | Simendinger | B29C 43/146 |
| | | | 137/375 |
| 2005/0257936 A1 | 11/2005 | Lehr | |
| 2006/0021653 A1 | 2/2006 | Weinhold | |
| 2011/0098409 A1* | 4/2011 | Burch | C08K 3/0008 |
| | | | 524/600 |
| 2011/0198526 A1 | 8/2011 | Tappe | |
| 2011/0233438 A1* | 9/2011 | Hubacek | F16J 15/028 |
| | | | 251/314 |
| 2011/0299917 A1* | 12/2011 | Samuelsson | F01D 5/30 |
| | | | 403/223 |
| 2012/0318525 A1* | 12/2012 | Coghill | E21B 34/06 |
| | | | 166/373 |

OTHER PUBLICATIONS

Shipham Valves, "AVT Composite Full Port Ball Valves", [retrieved from Internet on Jan. 3, 2012], published Dec. 10, 2010, http://www.shipham-valves.comien/product-ranges/avt-composite-valves/product/65-AVT-Composite-Ball-Valves, 2 pages.

Patent Examination Report No. 1, Australian Application No. 2012389797, Dec. 7, 2015, 3 pages.

Extended European Search Report issued in European Application No. 12884356.2 by the European Patent Office, dated May 3, 2016.

* cited by examiner

COMPOSITE WELLBORE BALL VALVE

This application is a 371 U.S. National Phase Application and claims the benefit of priority to PCT Application Serial No. PCT/US2012/054776, filed on Sep. 12, 2012 and entitled "Composite Wellbore Ball Valve", the contents of which are hereby incorporated by reference.

BACKGROUND

This disclosure relates to valves for use in a subterranean well system.

A ball valve is a type of valve that uses a spherical ball as a closure mechanism. The ball has a hole therethrough that is aligned with the direction of flow when the valve is opened and misaligned with the direction of flow when the valve is closed. Ball valves have many applications in well tools for use downhole in a wellbore, for example, as formation tester valves, safety valves, and in other downhole applications. Many of these well tool applications use a ball valve because ball valves can have large through bore for passage of tools, tubing strings, and flow, yet also be compactly arranged, for example, having a cylindrical outer profile that corresponds to the cylindrical outer profile of the remainder of the string carrying the ball valve into the wellbore and presenting few or no protrusions to hang up on the interior of the well.

DESCRIPTION OF DRAWINGS

FIG. 2A shows the example valve in an open position. FIG. 2B shows the example valve in a closed position.

Like reference symbols in the various drawings indicate like elements.

DETAILED DESCRIPTION

The concepts herein encompass a wellbore ball valve for use in a bore of a well system. The ball valve includes a fiber reinforced composite and/or a fiber reinforced composite seat. In certain instances, the composite reinforcement aids in reducing deformation of the ball closure under high pressure, and can improve the seal effectiveness and pressure holding capacity of the ball valve. For example, the effectiveness of the seal depends on the seat conforming to the surface of the ball closure. High pressure tends to deform the ball valve closure and the seat, tending to reduce contact pressure between the closure and seat in a manner that can compromise the seal. The composite reinforcement is configured to reduce the deformation and, in certain instances, improve the sealing effectiveness between the ball valve closure and seat.

Figure 1:
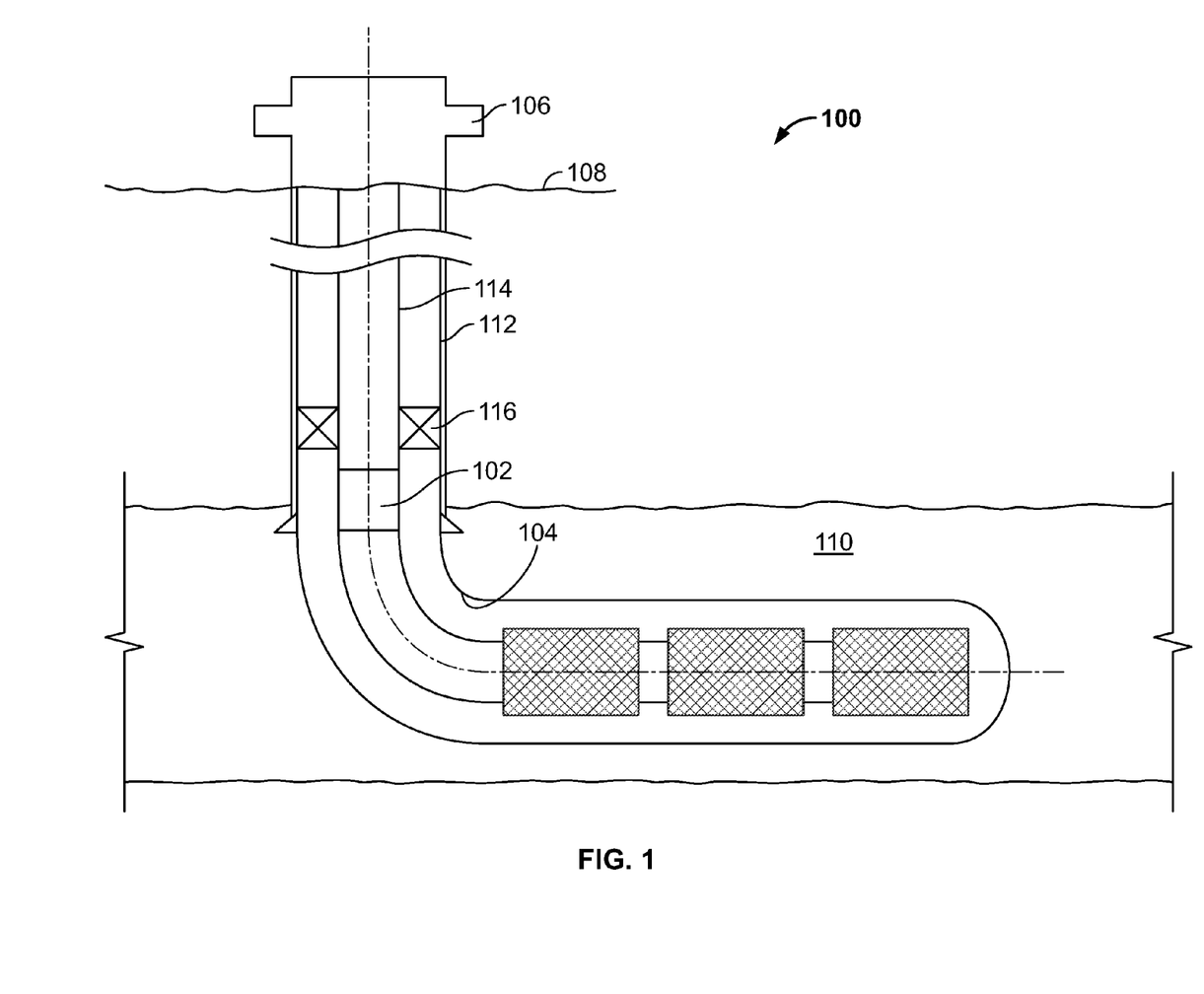
FIG. 1 is a side cross-sectional view of an example well system with a ball valve.

FIG. 1 is a side cross-sectional view of a well system 100 with an example valve 102 constructed in accordance with the concepts herein. As shown, the well system 100 includes a substantially cylindrical wellbore 104 that extends from well head 106 at a terranean surface 108 through one or more subterranean zones of interest 110. In FIG. 1, the wellbore 104 extends substantially vertically from the surface 108 and deviates to horizontal in the subterranean zone 110. However, in other instances, the wellbore 104 can be of another configuration, for example, entirely substantially vertical or slanted, it can deviate in another manner than horizontal, it can be a multi-lateral, and/or it can be of another configuration.

The wellbore 104 is lined with a casing 112 that extends from the well head 106, downhole, toward the bottom of the wellbore 104. The casing 112 provides radial support to the wellbore 104 and seals against unwanted communication of fluids between the wellbore 104 and surrounding formations. Here, the casing 112 ceases at the subterranean zone 110 and the remainder of the wellbore 104 is an open hole, i.e., uncased. In other instances, the casing 112 can extend to the bottom of the wellbore 104 or can be provided in another configuration.

A completion string 114 of tubing and other components is coupled to the well head 106 and extends, through the wellbore 104, downhole, into the subterranean zone 110. Once the well is brought onto production, fluids are produced from and injected into the subterranean zone 110 through the central bore of the completion string 114. Prior to bringing the well onto production, the completion string is used to perform the final steps in constructing the well. The completion string 114 is shown with a packer 116 above the subterranean zone 110 that seals the annulus between the completing string 114 and casing 112, and directs fluids to flow through the completion string 114 rather than the annulus. Notably, although described in the context of the completion string 114, the concepts herein are applicable to other types of well strings.

The example valve 102 is provided in the completion string 114 below the packer 116. The valve 102 when open, allows passage of fluid and communication of pressure through the completion string 114. When closed, the valve 102 seals against passage of fluid and communication of pressure between the lower portion of the completion string 114 below the valve 102 and the upper portion of the completion string 114. The valve 102 has provisions for both mechanical and remote operation. For mechanical operation, the valve 102 has an internal profile that can be engaged by a shifting tool to operate the valve. For remote operation, the valve 102 has a remote actuator assembly that responds to a signal (e.g., a hydraulic, electric, and/or other signal) to operate the valve. The signal can be generated remote from the valve 102, for example at the surface.

In the depicted example, the valve 102 is shown as a fluid isolation valve that is run into the wellbore 104 open, mechanically closed with a shifting tool and then eventually re-opened in response to a remote signal. However, the concepts herein are applicable to other types of valves. The valve 102, thus allows an operator to fluidically isolate the subterranean zone 110, for example, while an upper portion of the completion string 114 is being constructed, while subterranean zones above the valve 102 are being produced (e.g., in a multi-lateral well), and for other reasons. The concepts herein, however, are applicable to other configurations of valves. For example, the valve 102 could be configured as a safety valve. A safety valve is typically placed in the completion string 114 or riser (e.g., in a subsea well), and is biased closed and held open by a remote signal. When the remote signal is ceased, for example, due to failure of the well system above the valve 102, the valve 102 closes. Thereafter, the valve 102 is mechanically re-opened to recommence operation of the well.

Figure 2A:
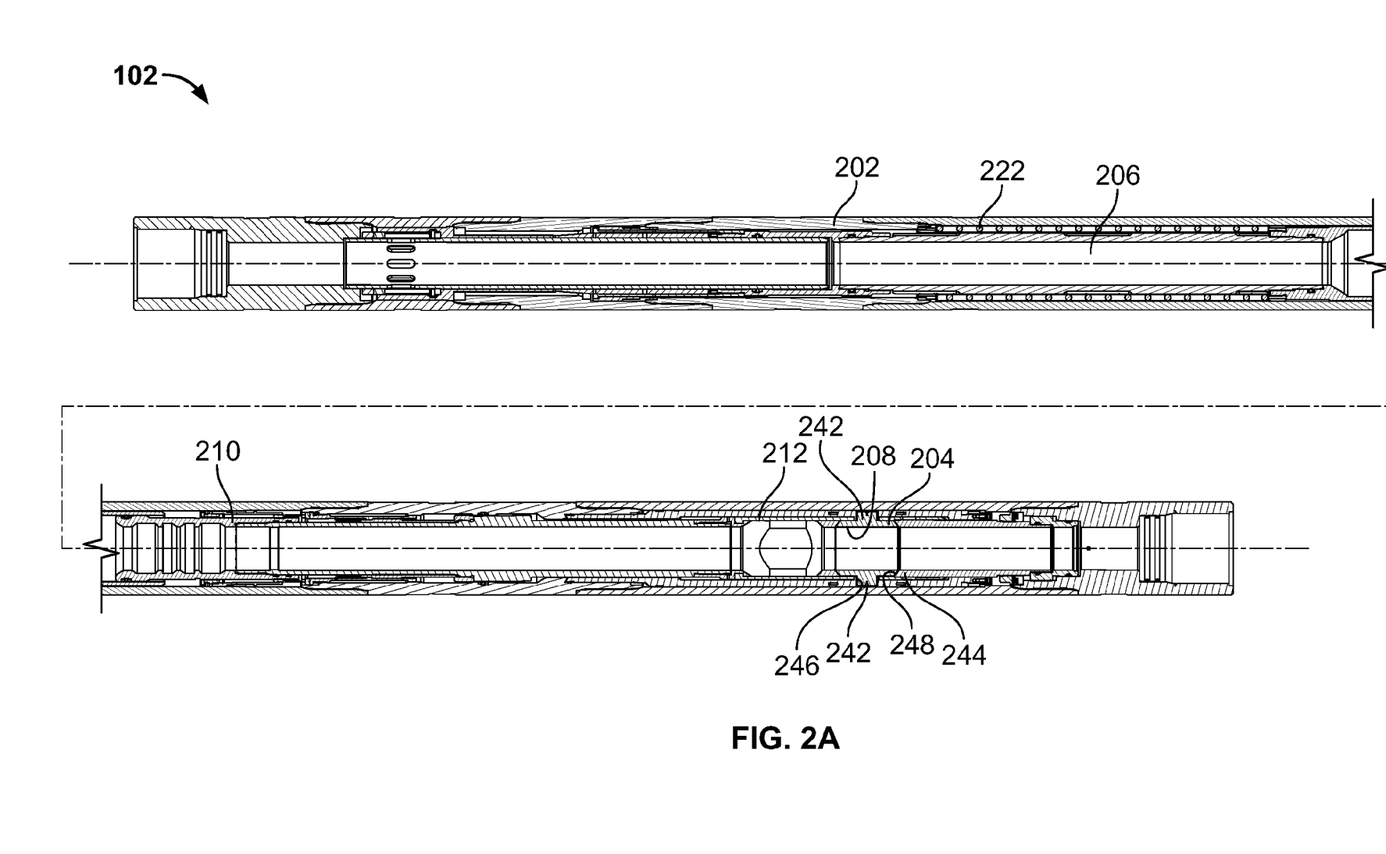
FIGS. 2A and 2B are side cross-sectional views of an example valve.
Figure 2B:
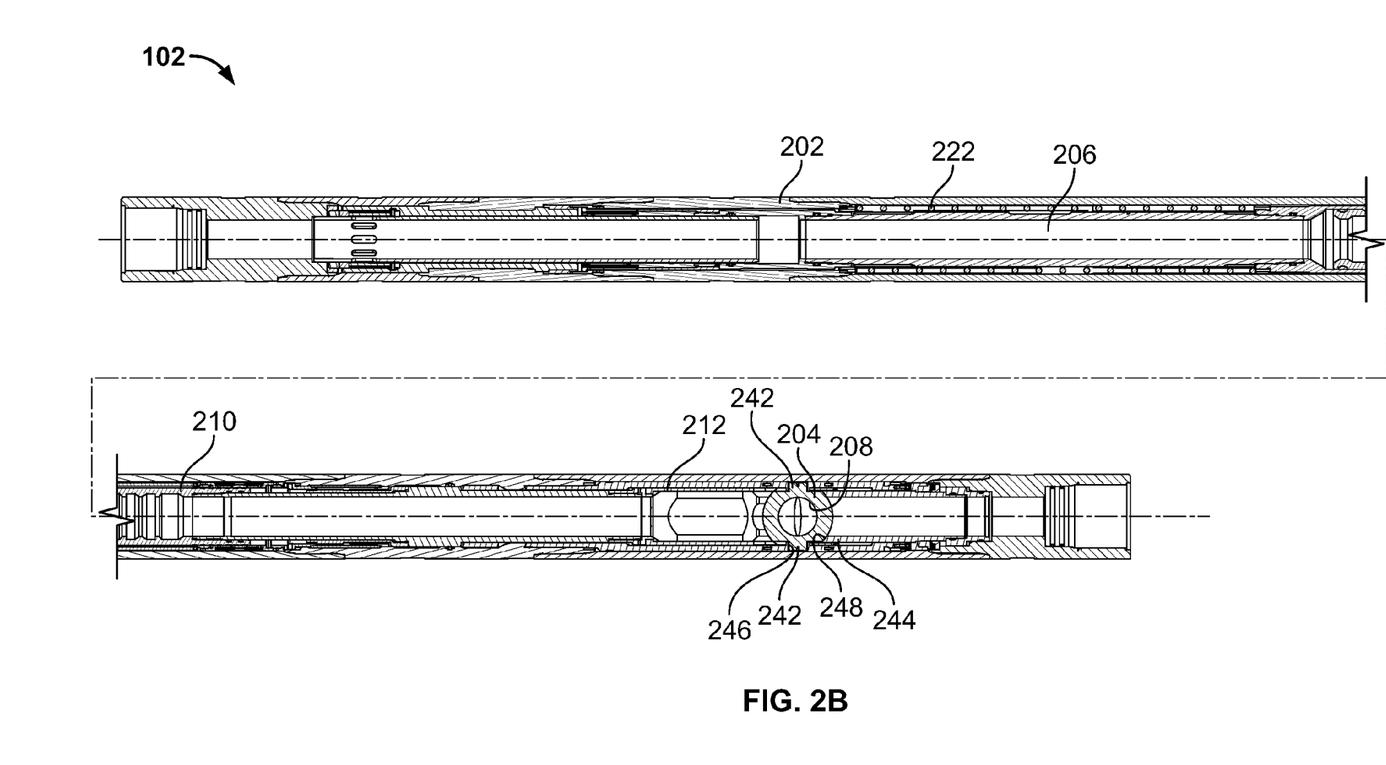

Turning now to FIGS. 2A and 2B, the valve 102 includes an elongate, tubular valve housing 202 that extends the length of the valve 102. The housing 202 is shown as made up of multiple parts for convenience of construction, and in other instances, could be made of fewer or more parts. The ends of the housing 202 are configured to couple to other components of the completion string (e.g., threadingly and/or otherwise). The components of the valve 102 define an internal, cylindrical central bore 206 that extends the length of the valve 102. The housing 202 contains a spherical (substantially or entirely spherical) ball valve closure 204 that, likewise, has a cylindrical, central bore 208 that is part of central bore 206. The central bore 206 is the largest flow bore through the valve 102. The valve closure 204 is carried to rotate about an axis transverse to the longitudinal axis of the valve housing 202 on two trunnions 242. The trunnions 242 are cylindrical and protrude outwardly from opposing sides of the valve closure 204 about the rotational axis. The trunnions 242 are received in corresponding receptacles 246 in the valve housing 202 and support the valve closure 204 axially in the housing 202 and allow the closure 204 to rotate about the rotational axis. The outer surface of the valve closure is planar (rather than spherical) in the regions around the trunnions 242.

The valve 102 is open when the central bore 208 of the valve closure 204 aligns with and coincides with the central bore 206 of the remainder of the valve 102 (FIG. 2A). The valve 102 is closed when the central bore 208 of the valve closure 204 does not coincide with, and seals against passage of fluid and pressure through, the central bore 206 of the remainder of the valve 102 (FIG. 2B). The valve closure 204 is in contact with a sealing surface 248 of an annular sealing seat 244. The seat 244 is springingly biased into contact with the outer surface of the valve closure 204 to form an initial seal. With the valve closure 204 closed and holding pressure, the seat 244 is pressure energized in that the pressure of the fluid in the central bore 206 acts on the seat 244 increasing the contact pressure of the seat 244 against the surface of the valve closure 204 and increasing the pressure holding capacity of the resulting seal.

The valve closure 204 is coupled to an elongate, tubular actuator sleeve 210 via a valve fork 212. The actuator sleeve 210 is carried in the housing 202 to translate between an uphole position (FIG. 2B) and a downhole position (FIG. 2A), and correspondingly move the valve fork 212 between an uphole position and a downhole position. When the actuator sleeve 210 (and valve fork 212) are in the uphole position, the valve closure 204 is in the closed position. As the actuator sleeve 210 (and valve fork 212) translates to the downhole position, the valve closure 204 rotates around the transverse axis to the open position when the central bore of the valve closure 204 breaks the ring shape and opens the seal.

In some instances, the valve 102 has provisions for remote operation, to operate the valve closure 204 in response to remote signal (e.g., a hydraulic, electric, and/or other signal). To this end, the valve 102 has a remote actuator assembly 222 that is coupled to the actuator sleeve 210. In some implementations, the valve 102 has provisions for mechanical operation, to allow operating the valve closure 204 with a shifting tool inserted through the central bore 206.

Notably, when closed, the pressure acting on the outer surface of the valve closure 204, is supported by the trunnions 242 supporting the valve closure 204 but not similarly supported near the openings of the central bore 208. Additionally, the valve closure 204 is thinnest in cross section near these openings. Thus, when fluid pressure is sealed in the central bore 206, the pressure loads tend to deform the valve closure 204 unequally, deflecting the spherical surface of the valve closure 204 inward (toward the centerline of the closure) more near the openings of the central bore 208 than near the trunnions 242. This deformation tends to reduce the contact pressure between the seat surface 248 and the spherical exterior surface of the valve closure 204, and tends to reduce the effectiveness and pressure holding capability of the seal. Additionally, pressure acting on the seat 244 tends to force the seat to swage over the valve closure 204 and, in doing so, diametrically expand.

The valve 102 uses composite materials to increase the stiffness of the valve closure 204 and seat 244 over configurations without composite materials. In certain instances, the use of composite materials improves the effectiveness of the seal in both leak resistance and pressure holding capacity. In certain instances, the use of composite materials enables higher pressure holding capacities than the same or similarly thickness valve closure 204 and/or seat 244 without composite materials. For example, for valve closures of a similar ball diameter and a similar interior central bore diameter, the composite reinforced valve closure 204 can seal against a higher pressure (e.g., have a higher pressure rating) than the non-composite reinforced valve closure. Thus, applications constrained by outer dimension (e.g., because of well bore diameter) and/or minimum central bore diameter (e.g., needing to large enough to pass a certain diameter string), the valve 102 using composite materials can hold a higher pressure than a valve without composite materials. In certain instances, the use of composite materials enables using a thinner valve closure 204 and/or seat 244 to hold a given pressure than would be needed without using composite materials.

In some instances, the valve closure 204 includes a metallic core structure reinforced with composite material that has been laid-up onto the exterior of the core. In some instances, the valve closure 204 includes a metallic core structure to which structures made of composite material are attached.

Figure 3:
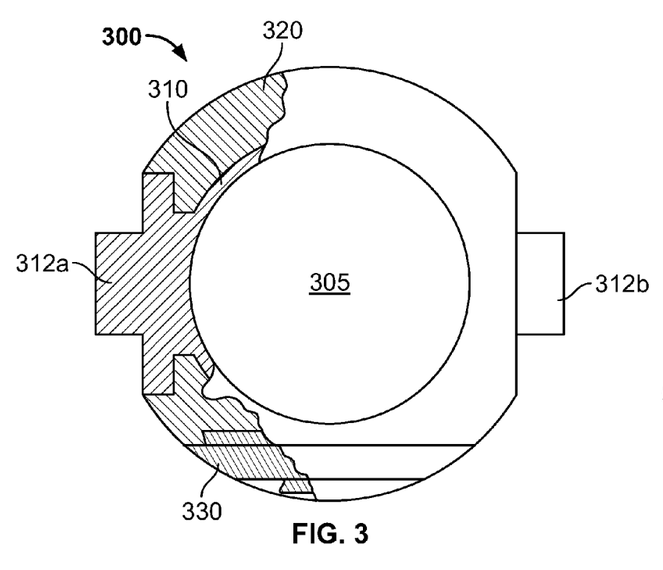
FIG. 3 is a half, side cross sectional view of an example reinforced valve closure.

FIG. 3 is a half cross sectional view of an example fiber reinforced composite ball valve closure 300 taken through the center of the closure 300. The valve closure 300 may be used as the closure 204 as shown in FIG. 2. The ball valve closure 300 is of a type that includes a metallic core 310 with a fiber reinforced composite material 320 that has been laid-up onto the exterior the core 310. The core 310 has a cylindrical hole that defines a central bore 305 that corresponds to the central bore of the tubing string when the valve is installed in a tubing string. In certain instances, the core 310 defines the some or all of the surfaces of the central bore 305 such that some or all of surface of the central bore 305 is metallic. In certain instances, the core 310 defines some portion of the spherical outer surface of the valve closure 300. The core 310 includes two trunnions 312a and 312b extending outward from opposing sides of the core 310 that, as described above, are used in supporting the valve closure 300 in the remainder of the valve. Notably, although shown as integral with the core 310, the trunnions 312a, 312b could be separate elements and affixed to the remainder of the core 310 with fasteners, by bonding and/or in another manner.

The core 310 functions as a foundation for the fiber reinforced composite material 320. For example, layers of fiber reinforced composite material 320, including fiber (e.g., carbon, aramid, fiber glass and/or other fibers) embedded in polymer (e.g., polyether ether ketone—PEEK, epoxy resin, polyester resin, and/or other polymer), can be applied (i.e., laid up) onto the core 310 to build up the composite material 320 into the spherical shape of the outer surface of the ball valve closure 300. In certain instances, other fillers such as expanded foam, structural shapes (e.g., honeycomb or grid shapes and/or other structural shapes) and/or other fillers can be used. The fibers can be manufactured as pre-impregnated with the polymer (also known as "prepreg") or can be dry fibers wetted during the lay-up process with flowable polymer. The fibers can be woven in the form of a fabric having a square, plain, tweed, crow's foot and/or other weave or the fibers can be unidirectional and/or monofilament. Different layers can have different fiber arrangements, for example, some layers can be fabric and some layers can be unidirectional, different fabric layers can have different weave patterns, and/or different layers can have different fiber materials. A mold can be used to form the fiber reinforced composite material 320 into the spherical outer surface of the valve closure 300 and/or some or all of the surface of the fiber reinforced composite material 320 can be machined, ground and/or otherwise mechanically shaped in forming the spherical outer surface of the valve closure 300.

The layers of fiber reinforced composite can be arranged to produce a structure having a higher material stiffness and strength than the metallic core and/or an entirely metallic ball valve closure, and can have anisotropic material properties (i.e., the stiffness of the material itself, apart from its geometry), such as anisotropic material stiffness and material strength. For example, the layers can be arranged to produce a higher material stiffness in a in some load directions than others. In certain instances, the layers can be arranged to produce a higher material stiffness corresponding to higher or the highest loads and/or stress. Similarly, the layers can be arranged to produce a higher material strength in some areas than others. In certain instances, the layers can be arranged to produce a higher material strength in areas of higher or the highest loading and/or stress. In certain instances, the layers are arranged with fibers in an axial direction, extending between the openings of the valve closure 300. The axial fibers increase stiffness and resist deformation of the spherical surface inward toward the central bore 305, maintaining a spherical shape of the closure 300. In certain instances, the layers are arranged with fibers circumferentially around the openings to the central bore 305 to further increase stiffness and resist deformation of the spherical surface inward toward the central bore 305. In certain instances, the layers are arranged with fibers spanning between the trunnions 312a, 312b to increase stiffness and resist deformation of the spherical surface and misalignment of the trunnions as the trunnions are loaded. Finally, in addition to or as an alternative to the above fiber orientations, other fibers can be arranged at an acute angle (e.g., 30, 45 and/or another angle) to a specified and/or primary stress direction (e.g., axial or lateral). Still other arrangements of fibers can be used. In certain instances, the majority of the fibers are arranged at an acute angle to axial, and additional fibers are arranged axially and/or circumferentially around the openings of the central bore 305 to produce anisotropic material stiffness, due to the loading and/or geometry of the closure, yields isotropic deformation of the valve closure 300 (substantially isotropic or entirely isotropic) to the pressure loads it will encounter when operating to seal against its maximum rated or other specified pressure (i.e., when operated downhole to seal the well).

The valve closure 300 includes an annular, metallic sealing surface 330 formed in a portion of a sphere and configured to form a metal-to-metal seal with a metallic surface of a valve seat (e.g. seat 244). The sealing surface 330 can be a ring bonded to the fiber reinforced composite 430 during or after the lay-up and/or provided as part of the core 310 and the lay-up performed around it.

Figure 4:
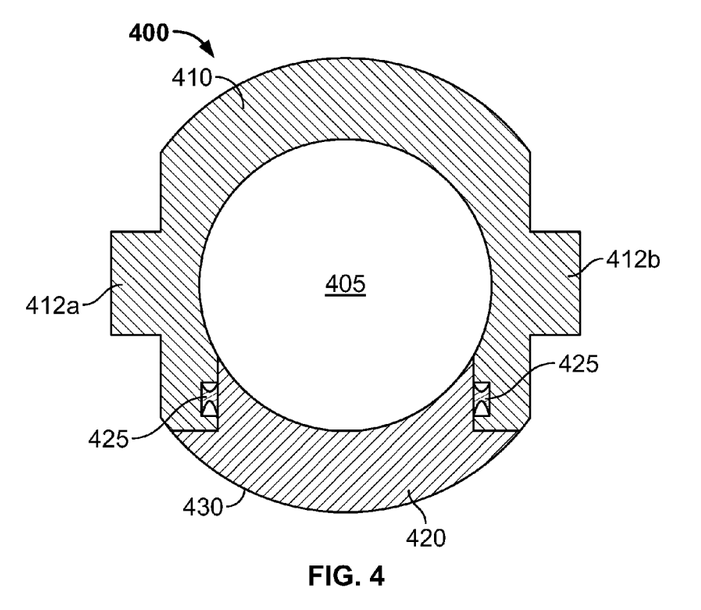
FIG. 4 is a half, side cross-sectional view of an example reinforced valve closure.

FIG. 4 is a half cross sectional view of another example composite reinforced valve closure 400 taken through the center of the closure 400. The valve closure 400 can be used as the closure 204 as shown in FIG. 2. The ball valve closure 400 is of a type that includes a core 410 that receives and carries a pre-constructed seal surface component 420. In certain instances, the core 410 is constructed from entirely fiber reinforced composite, but core 410 can also have a metallic sub-core laid up with fiber reinforced composite. In certain instances, the seal surface component 420 is constructed of metal. Seals 425 (e.g., by-directional cup seals and/or another type of seals) can be provided along the interface of the core 410 and seal surface component 420. The seal surface component 420 can be bonded to the core 410, retained with one or more fasteners (bolts, screws, and/or other fasteners), and/or retained in another manner.

The core 410 and seal surface component 420 cooperate to define a central bore 405 having a part with the same material as the core 410 (e.g., fiber reinforced composite) and part with the same material as the seal surface component 420. However, in other instances, the core 410 could be constructed to solely form the surface of the central bore 405. The core 410 forms a portion of the spherical outer surface of the valve closure 400, and the seal surface component 420 forms the remainder of the spherical outer surface. The seal surface component 420 is sized to provide a sealing surface to form a metal-to-metal seal with a metallic valve seat (e.g., seat 244). The core 410 includes two trunnions 412a and 412b, which, similar to the trunnions 312a and 312b, extend outward from opposing sides of the core 410 for use in supporting the valve closure 400. Notably, although shown as integral with the core 310, the trunnions 312a, 312b could be separate elements and affixed to the remainder of the core 310 with fasteners, by bonding and/or in another manner.

The core 410 can be constructed from layers of fiber reinforced composite material. Similar fiber reinforced composite materials, fabrics and monofilament, and arrangements of layers as those described above in connection with the valve closure 300 can be used. As above, a mold can be used to form the core 410 and/or some or all of the surface of the composite component can be mechanically shaped. As above, the fibers can be arranged to produce a structure having higher material stiffness than an entirely metallic ball valve closure, and can have anisotropic material stiffness and strength characteristics. The resulting valve closure 400 can have anisotropic material stiffness to achieve isotropic deformation of the valve closure 400 (substantially isotropic or entirely isotropic) to the pressure loads it will encounter when operating to seal against its maximum rated or other specified pressure (i.e., when operated downhole to seal the well).

Figure 5:
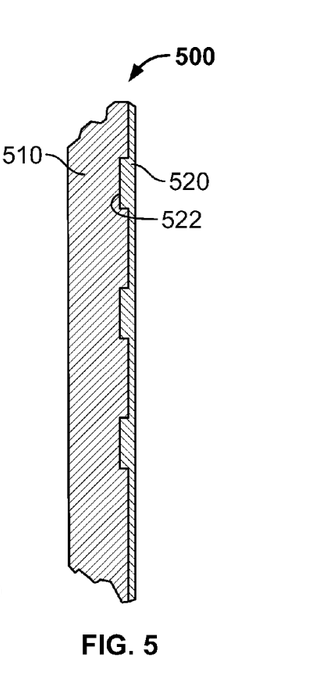
FIG. 5 is a half, side cross sectional view of an example reinforced seat.

FIG. 5 is a side cross sectional view of a composite reinforced annular seat 500. The seat 500 may be used as the valve seat 244 of valve 102 of FIGS. 2A and 2B. The seat 500 includes a metal sealing seat surface component 510 with a fiber reinforced composite support 520. The seat surface component 510 includes a metallic, annular sealing seat surface that is semi-spherical and configured to contact and form a metal-to-metal seal with a spherical or semi-spherical metal surface on the exterior of the valve closure (e.g., valve closure 300, 400). The composite support 520 is configured to reinforce and support the seat surface component 510 to reduce deformation under pressure loading. For example, in certain instances, the fibers of the composite support 520 can be arranged to provide anisotropic material stiffness and strength, being greater in the circumferential direction than in other directions. In certain instances, the fibers can be arranged to achieve anisotropic material stiffness that, due to the loading and/or geometry of the seat 500, yields isotropic deformation of the seat 500 (substantially isotropic or entirely isotropic) to the pressure loads it will encounter when operating to seal against its maximum rated or other specified pressure (i.e., when operated downhole to seal the well).

The composite support 520 can be constructed from layers of fiber reinforced composite material. Similar fiber reinforced composite materials, fabrics and monofilament, and arrangements of layers as those described above in connection with the valve closure 300 can be used. As above, a mold can be used to form the composite support 520 and/or some or all of the surface of the composite component can be mechanically shaped.

The composite support 520 is affixed to the metal seat surface component 510, for example, bonded (with adhesive and/or with the seat surface component 510 laid up into the composite support 520), affixed with fasteners, and/or in another manner. FIG. 5, shows the facing surfaces of the composite support 520 and seat surface component 510 continuously affixed to one another so that the composite support 520 and seat surface component 510 do not substantially flex relative to one another and act as a unitary component. In certain instances, the composite support 520 includes protrusions 522 that mate with corresponding recesses in the metallic seat surface component 510 to retain the composite support 520 to the seat surface component 510 and to transfer loads between the components. In other instances, the seat surface component 510 can be provided with protrusions and the composite support 520 provided with recesses. In certain instances, the protrusions 522 can have a square shoulder, orthogonal to the mating surfaces of the seat surface component 510 and composite support 520. Other arrangements are, however, are within the scope of the concepts herein.

While this specification contains many specific implementation details, these should not be construed as limitations on the scope of any implementations or of what may be claimed, but rather as descriptions of features specific to particular implementations. Thus, particular implementations of the subject matter have been described. Other implementations are within the scope of the following claims.

What is claimed is:

1. A wellbore ball valve, comprising:
an adjustable ball valve closure comprising:
an interior, central through-bore;
a substantially spherical outer surface comprising a fiber reinforced composite material; and
an annular metallic sealing surface; and
a ball carrying assembly having an annular, metallic sealing seat surface adapted to contact and form a metal-to-metal seal with the metallic sealing surface of the ball valve closure when the ball valve closure is adjusted to a closed position.

2. The wellbore ball valve of claim 1, where the ball valve closure comprises a metal core with fiber reinforced composite laid-up on the core.

3. The wellbore ball valve of claim 2, where the metal core comprises a metal, outwardly protruding, mounting trunnion; and
where the ball carrying assembly receives the mounting trunnion to support the ball valve closure.

4. The wellbore ball valve of claim 1, where the metallic sealing surface is annular.

5. The wellbore ball valve of claim 1, where the ball valve closure comprises carbon fibers in a polyether ether ketone binder.

6. The wellbore ball valve of claim 1, where the ball carrying assembly comprises a fiber reinforced composite, annular seat having the metallic sealing seat surface configured to form a metal-to-metal seal with the metallic sealing surface of the ball valve closure.

7. The wellbore ball valve of claim 6, where the seat comprises a metal sealing seat surface component supported against circumferential expansion by a fiber reinforced composite support.

8. The wellbore ball valve of claim 7, where the fibers of the fiber reinforced composite seat are arranged to provide anisotropic material stiffness.

9. The wellbore ball valve of claim 7, where one of the metal sealing seat surface component or the fiber reinforced composite support comprises protrusions that are received in corresponding receptacles of the other of the metal sealing seat surface component or the fiber reinforced composite support.

10. The wellbore ball valve of claim 6, where the fiber reinforced composite of the annular seat comprises carbon fibers in a polyether ether ketone binder.

11. A wellbore ball valve, comprising:
a fiber reinforced composite ball valve closure comprising an interior, central through-bore and an annular metallic sealing surface; and
a ball carrying assembly having an annular, metallic sealing seat surface adapted to contact and form a metal-to-metal seal with the metallic sealing surface of the ball valve closure when the ball valve closure is closed,
where the fiber reinforced composite ball valve closure comprises:
a fiber reinforced composite core defining a first portion of a spherical outer surface of the ball valve closure; and
a seal surface component made substantially of metal and received in the core, the seal surface component defining a second portion of the spherical outer surface and defining the metallic sealing surface.

12. A method, comprising:
contacting a metallic sealing surface of a ball valve closure to a metallic seat surface, the ball valve closure comprising a substantially spherical outer surface comprising a fiber reinforced composite material; and
sealing against communication of pressure through a ball valve comprising the ball valve closure with a metal-to-metal seal between the metallic sealing surface and the metallic seat surface.

13. The method of claim 12, further comprising supporting the metallic sealing surface with a fiber reinforced composite seat portion.

14. The method of claim 12, where the fiber reinforced composite comprises carbon fibers in a polyether ether ketone binder.

15. A well tool, comprising:
a body defining a central bore;

an adjustable ball valve closure in the central bore, the ball valve closure comprising a substantially spherical outer surface comprising a fiber reinforced composite material and a metallic surface; and a seat configured to form a metal-to-metal seal with the metallic surface of the ball valve closure when the ball valve closure is adjusted to a closed position.

16. The well tool of claim 15, where the seat comprises a metal sealing surface affixed to a fiber composite support.

17. The well tool of claim 15, where the fiber composite comprises carbon fiber composite.

* * * * *